US007039389B2

(12) United States Patent
Johnson, Jr.

(10) Patent No.: US 7,039,389 B2
(45) Date of Patent: *May 2, 2006

(54) CELLULAR TELEPHONE-BASED TRANSACTION PROCESSING

(75) Inventor: William S. Johnson, Jr., Jamestown, NC (US)

(73) Assignee: Gilbarco Inc., Greensboro, NC (US)

( * ) Notice: Subject to any disclaimer, the term of this patent is extended or adjusted under 35 U.S.C. 154(b) by 564 days.

This patent is subject to a terminal disclaimer.

(21) Appl. No.: 10/349,352

(22) Filed: Jan. 22, 2003

(65) Prior Publication Data

US 2003/0153278 A1 Aug. 14, 2003

Related U.S. Application Data

(63) Continuation of application No. 09/481,790, filed on Jan. 12, 2000, now Pat. No. 6,535,726.

(51) Int. Cl.
*H04M 11/00* (2006.01)

(52) U.S. Cl. .................. 455/406; 455/405; 705/26; 705/235

(58) Field of Classification Search ................ 455/406, 455/405, 407, 408, 464, 90, 414; 705/26, 705/235, 381
See application file for complete search history.

(56) References Cited

U.S. PATENT DOCUMENTS

| 3,764,747 A | 10/1973 | Nakajima et al. ........... 455/407 |
| 3,900,093 A | 8/1975 | Bednar et al. ............... 194/9 T |
| 4,087,092 A | 5/1978 | Krause et al. ............... 273/138 |

(Continued)

FOREIGN PATENT DOCUMENTS

EP      0 780 802       12/1996

(Continued)

OTHER PUBLICATIONS

"A Sales Pitch With That Soda?", Walker, Washington Post Staff Writer, pp. 1-3, Jun. 24, 1999.

(Continued)

*Primary Examiner*—Tilahun Gesesse
*Assistant Examiner*—Tan Trinh
(74) *Attorney, Agent, or Firm*—Withrow & Terranova, PLLC (57) ABSTRACT

A retail transaction system provides enhanced customer convenience and increased transaction security by sending transaction information to a cellular network provider via a customer's digital cellular phone. For example, a fuel dispenser is equipped with a communications link allowing direct communications to a customer's cellular phone. When a customer desires to conduct a transaction using the fuel dispenser, the fuel dispenser transmits select information to the customer's cellular telephone using this communications link. A telephone number is included in the select information. When the customer presses send, or otherwise causes their telephone to dial the number transferred from the fuel dispenser, the select information along with any additional customer information is sent to the cellular network. This information is used by the network to authorize a purchase transaction for the customer, such authorization information returned to the fueling station at which the fuel dispenser is located via a cellular link. For enhanced security, the customer may be required to input their PIN in order to complete the transaction. Notably, the PIN and the remainder of the transaction information sent from the customer phone to the cellular network is intrinsically secure due to the digital encryption employed by the digital cellular protocol. Optionally, the system may be configured to cause the customer's cellular phone to automatically dial the number transferred by the fuel dispenser. This capability may be enabled at the customer's option. The system may be extended to other retail systems including in-store point-of-sale systems (POS).

39 Claims, 6 Drawing Sheets

U.S. PATENT DOCUMENTS

| | | | | |
|---|---|---|---|---|
| 4,860,341 | A | 8/1989 | D'Avello et al. | 379/91 |
| 5,031,098 | A | 7/1991 | Miller et al. | 705/21 |
| 5,072,380 | A | 12/1991 | Randelman et al. | 364/406 |
| 5,228,084 | A | 7/1993 | Johnson et al. | 380/23 |
| 5,334,824 | A | 8/1994 | Martinez | 235/380 |
| 5,359,182 | A | 10/1994 | Schilling | 235/380 |
| 5,596,501 | A | 1/1997 | Comer et al. | 364/464.23 |
| 5,714,741 | A | 2/1998 | Pieterse et al. | 235/380 |
| 5,719,918 | A | 2/1998 | Serbetciouglu et al. | 380/271 |
| 5,748,104 | A | 5/1998 | Argyroudis et al. | 340/870.11 |
| 5,794,655 | A | 8/1998 | Funderburk et al. | 380/24 |
| 5,796,832 | A | 8/1998 | Kawan | 705/65 |
| 5,862,222 | A | 1/1999 | Gunnarsson | 380/24 |
| 5,903,830 | A | 5/1999 | Joao et al. | 455/406 |
| 6,098,879 | A | 8/2000 | Terranova | 235/384 |
| 6,195,542 | B1 | 2/2001 | Griffith | 455/406 |
| 6,198,915 | B1 | 3/2001 | McGregor et al. | 455/406 |
| 6,535,726 | B1 * | 3/2003 | Johnson | 455/406 |

FOREIGN PATENT DOCUMENTS

| | | |
|---|---|---|
| ES | 1 027 556 | 3/1995 |
| JP | 4253695 | 9/1992 |
| SE | 9702373 | 6/1997 |
| WO | WO 80/02512 | 11/1980 |
| WO | WO 97/45814 | 5/1997 |
| WO | WO 98/54678 | 5/1998 |
| WO | WO 01/20844 | 3/2001 |

OTHER PUBLICATIONS

"Add-Ons", www.televend.co.il/addons, Apr. 10, 1999.
"Care for a Teledrink?", Levin, PC Magazine, Aug. 1, 1999, pp. 28.
"Cell phone to take on new roles", Haring, USA Today Tech Reviews, Jul. 7, 1999.
"Coin Receiver", www.televend.co.il/coin, Apr. 10, 1999.
"Coupon Dispenser", www.televend.co.il/coupon, Apr. 10, 1999.
"Dawn of a New Era in Billing Systems: The Information Age", Maunder, pp 1067-1071, 1997 Annual Review of Communication.
"Dial C for Coffee", Carrington, BBC Online Network, Sci/Tech, Oct. 27, 1999.
"Drinks Anyone?", Jerusalem Post Digital Israel Hi-Tech Supplement, Innovations Section, Jul. 4, 1999.
"Fast Foods", www.televend.co.il/fast_food, Apr. 10, 1999.
"Finns Charge Cokes and Abba to Cell Phones", Wired News Report, www.wired.com/news/news/technology/story/8494.html, Nov. 12, 1997.
"Gaming", www.televend.co.il/gaming, Apr. 10, 1999.
"GSM Superphones", Harte, McGraw-Hill Telecommunications, pp. 34-40.
"Handhelds Beaming Up a Coke?", Knapp, Wired.News.Com, Jun. 23, 1999.
"Hotels", www.televend.co.il/hotels, Apr. 10, 1999.
"IrDA Transceiver—buy a drink with your Palm PC", www.televend.co.il/irda, Apr. 10, 1999.
"Israel. Vending machine Links with phone or PC", Jerusalem Post, pp. 10, Jul. 4, 1999.
"Keypad—buy a drink with your home phone or via the internet", www.televend.co.il/keypad, Apr. 10, 1999.
"LCD Command Display", www.televend.co.il/lcd, Apr. 10, 1999.
"Multimedia A/V Interface", www.televend.co.il/multimedia, Apr. 10, 1999.
"New No-Cash Vending Machine", Israel Business Today, vol. 13, No. 8, pp. 16, Aug. 1, 1999.
"New pay phone operates vie for some of C&P's coin Chesapeake & Potomac Tel: Shares Maryland pay telephone market with several other companies", Sun (Baltimore, MD), pp. B;14, May 2, 1987.
"Paging Smarter Snacks", Kritz, Wired News, www.wired.com/news/news/technology/story/18343.html, Mar. 9, 1999.
"Parking Meters", www.televend.co.il/parking, Apr. 10, 1999.
"Phones used for cashless buys", Infoworld, vol. 21, No. 29, pp. 16, Jul. 19, 1999.
"Secure System", www.televend.co.il/secure_system, Apr. 10, 1999.
"Televend builds 'telecon-commerce' technology", Network World, Jul. 19, 1999.
"The Sell Phone: Dial "M" for Munchies", Ringle, Washington Post Staff Writer, Life Style Section, p. C01, Jun. 19, 1999.
"The TD2000-buy a drink with your mobile phone",www.televend.co.il/td2000, Apr. 10, 1999.
"The vending machine that lets you buy sweets by phone", Bailey, Daily Telegraph, Apr. 10, 1999.
"Transportation", www.televend.co.il/transportation, Apr. 10, 1999.
"Trouble Shooting", www.televend.co.il/trouble_shooting, Apr. 10, 1999.
"TVMS—Televend Management System", www.televend.co.il/tvms, Apr. 10, 1999.
"Web-based Advertising", www.televend.co.il/web-based_advertising, Apr. 10, 1999.
"Welcome to Televend", www.televend.co.il/team, Apr. 10, 1999.
"Wireless Phones Enter a New World", pp. 1, no date given.
"You Did What on a Cell Phone?", Naik, Staff Reporter of The Wall Street Journal, pp. 1, Jul. 22, 1999.
"ZDNet: PC Computing, Gas Pump, Phone Home", ZDNet: PC Computing, 1998.

* cited by examiner

CELLULAR TELEPHONE-BASED TRANSACTION PROCESSING

This application is a continuation of application Ser. No. 09/481,790, filed on Jan. 12, 2000 now U.S. Pat. No. 6,535,726.

FIELD OF THE INVENTION

The present invention relates to transaction processing based on cellular communications, and particularly relates to using a customer's digital cellular phone to transmit transaction information.

BACKGROUND OF THE INVENTION

Retail sales systems must provide convenience for the customer and efficiency for the retailer. Credit and debit cards provide retailers with one mechanism for increasing the efficiency of retail sales systems, while providing a level of convenience to consumers. Indeed, credit card and debit card transactions are ubiquitous, with a variety of retail equipment providing such capability. A given retailer or merchant is effectively obligated to provide credit transaction capability because it is so widely expected. Currently, banks provide virtually all non-proprietary credit/debit sales—(Visa, MasterCard, AMEX, etc.). These banks typically charge from 3% to 6% to float the billing amount for a given transaction through a billing cycle—typically three to four weeks. These costs are borne directly by the merchants and indirectly by the consumers, and provide a significant revenue stream for the banks or credit card companies. Indeed, American consumers charged billions of dollars last year, and when international credit transactions are considered, the total amount of credit charges is staggering.

However, conventional charge transactions do not necessarily provide the greatest convenience and security to consumers, nor do they provide retailers with the greatest efficiency. Credit card transactions themselves are subject to fraudulent charging activity because, conventionally, they do not require specific identification information from the individual using the charge card. As a consequence, someone other than the authorized account holder could use the charge card. This is particularly true in automated transaction systems, such as are commonly found at fueling stations, pay phones, and vending systems. In such environments, transaction authorization is based on receipt of valid information from a credit card associated with an active charge account. Provided the automated retail system can verify credit authorization, as is typically done by contacting a credit authorization network, the transaction will be authorized without benefit of specifically identifying the person using the charge card.

Debit card transactions, although similar to credit card transactions, typically require the customer to enter a PIN associated with the authorized account. Further, a debit card is more typically associated with a bank account such as a checking account rather than with a charge account. Ideally, only the authorized account holder knows the PIN corresponding to the account. When a debit-card holder attempts to conduct a transaction with their debit card, they are required to enter the correct PIN before the transaction can be authorized. Clearly, unless the privacy of the PIN has been compromised, this provides an additional level of security not commonly found with pure credit card transactions. However, usage of a PIN can place additional burdens on the merchant because the complexity and expense of the equipment required to input and process PINs can be prohibitive. Indeed, European debit card transactions must be supported by bank-authorized PIN processing hardware. Such hardware carries significant expense and may be impractical for installation in vending or retail systems associated with low-cost or low-margin products and services.

A growing number of customers own cellular telephones and, in particular, own digital cellular telephones. Digital cellular telephones are distinguished from their earlier generation analog counterparts in a number of ways. One significant distinction of the newer digital cellular phones is their intrinsic communications security. Signaling between a digital cellular phone and its corresponding cellular network is based on digitally encrypted communications that are substantially more difficult to intercept and decipher than the signaling schemes used in earlier analog phones. As such, these digital cellular phones are suitable for use in transaction processing, wherein a customer may transmit certain information, including their PIN, to effect a given retail transaction. Further, using a customer's digital cellular telephone as an integral part of a retail transaction system is consistent with the desire to provide customers with ever more convenient retail transactions. Indeed, developing generations of cellular telephones incorporate more and more functionality for their owners and will likely come to serve as all-in-one communication devices.

Accordingly, there is a need to provide retail systems capable of communicating certain transaction information to a cellular network for the purpose of obtaining transaction authorization, with such information sent through a customer cellular telephone. Ideally, the retail system would additionally have the capability of receiving authorization information from the cellular network through a second cellular link apart from the customer's cellular phone. This second cellular link would also allow the retail system to complete the transaction by sending transaction amount information back to the cellular network for billing against the customer's cellular phone account.

SUMMARY OF THE INVENTION

The present invention provides a retail transaction system adapted to transfer select information to a customer's cellular phone for subsequent transfer to a cellular billing network by the customer's cellular telephone and further adapted to receive transaction authorization information from the cellular billing network through a separate cellular link. The retail system is further adapted to conduct a retail transaction based on the transaction authorization information it receives and, upon completion of the transaction, transmit transaction cost information back to the cellular billing network for billing against the customer's cellular telephone account. In the preferred embodiment, the retail transaction system is a fuel dispenser in combination with a point-of-sale system or site controller.

The fuel dispenser is associated with a communications interface that provides a communications link between the fuel dispenser and the customer's proximate cellular telephone. Using the communications link, the fuel dispenser transfers select site information to the customer cellular telephone, such site information preferably including a station ID, a fuel dispenser ID, and an outgoing phone number. The cellular telephone then calls, either automatically or under manual customer control, the outgoing phone number, thereby contacting the cellular billing network. Once in contact with the network, the select site information, along with additional customer information stored in the cellular telephone, is transferred from the cellular telephone to the network.

The cellular billing network uses this information to determine authorization for the transaction. The network communicates the authorization information back to the point-of-sale system. If the transaction is authorized, the site controller is adapted to control the fuel dispenser, permitting the customer to dispense the desire quantity fuel. After the customer completes dispensing activities, the fuel dispenser sends quantity and/or cost information back to the site controller. In turn, the site controller communicates this information back to the cellular billing network for assessment against the customer's cellular telephone account. The point-of-sale system is associated with a cellular communications interface allowing the transmission and reception of information to and from the cellular billing network.

DETAILED DESCRIPTION OF THE INVENTION

The system of the present invention includes features allowing it to use a customer's cellular telephone for completing a purchase transaction. These features provide the customer with added convenience. Transactions based on cellular communications can provide enhanced security if the cellular phone employs secure digital signaling protocols to communicate with its supporting cellular network. Examples of such digital signaling schemes include IS-95, which defines an interim standard for one form of digital cellular communications. GSM-based cellular phones, as are prevalent in the European communities, provide another example of secure digital cellular communications. While not necessary to conduct a basic transaction, the security of a digital cellular phone provides advantages if the purchase transaction requires the customer to enter a PIN.

In the present invention the customer conducts a retail transaction using their cellular telephone. According to the present invention, a retail sales system includes adaptations that allow it to transfer select site information to a customer's cellular telephone. Then, either automatically or under manual customer control, the cellular telephone calls a supporting cellular network and transfers this select site information, along with additional customer information already stored in the cellular telephone. Preferably, the cellular network processes the customer information to determine transaction authorization and then uses the select site information to contact the retail system for the purpose of conveying authorization information back to the retail system. In alternate embodiments, the cellular network transfers customer and select site information received from the customer cellular telephone to an outside billing or authorization network. Although in the preferred embodiment, transaction authorization is returned to the retail system via a cellular link, transaction authorization may be returned to the retail system using a standard telephone line, Internet connection, other network connection, or any combination of such communication technologies.

When implemented in the preferred embodiment, the supporting cellular network determines transaction authorization and provides this information to the retail system via a cellular communications interface integral to the retail system. Thus, outgoing information, including retail site identification and customer identification, is sent to the supporting cellular network via the customer's cellular telephone. Incoming information, including transaction authorization, is returned from the supporting cellular network directly to the retail system via its cellular link. The retail system also communicates final transaction charges back to the supporting cellular network so that appropriate charges may be assessed against the customer's cellular telephone account.

Figure 1A:
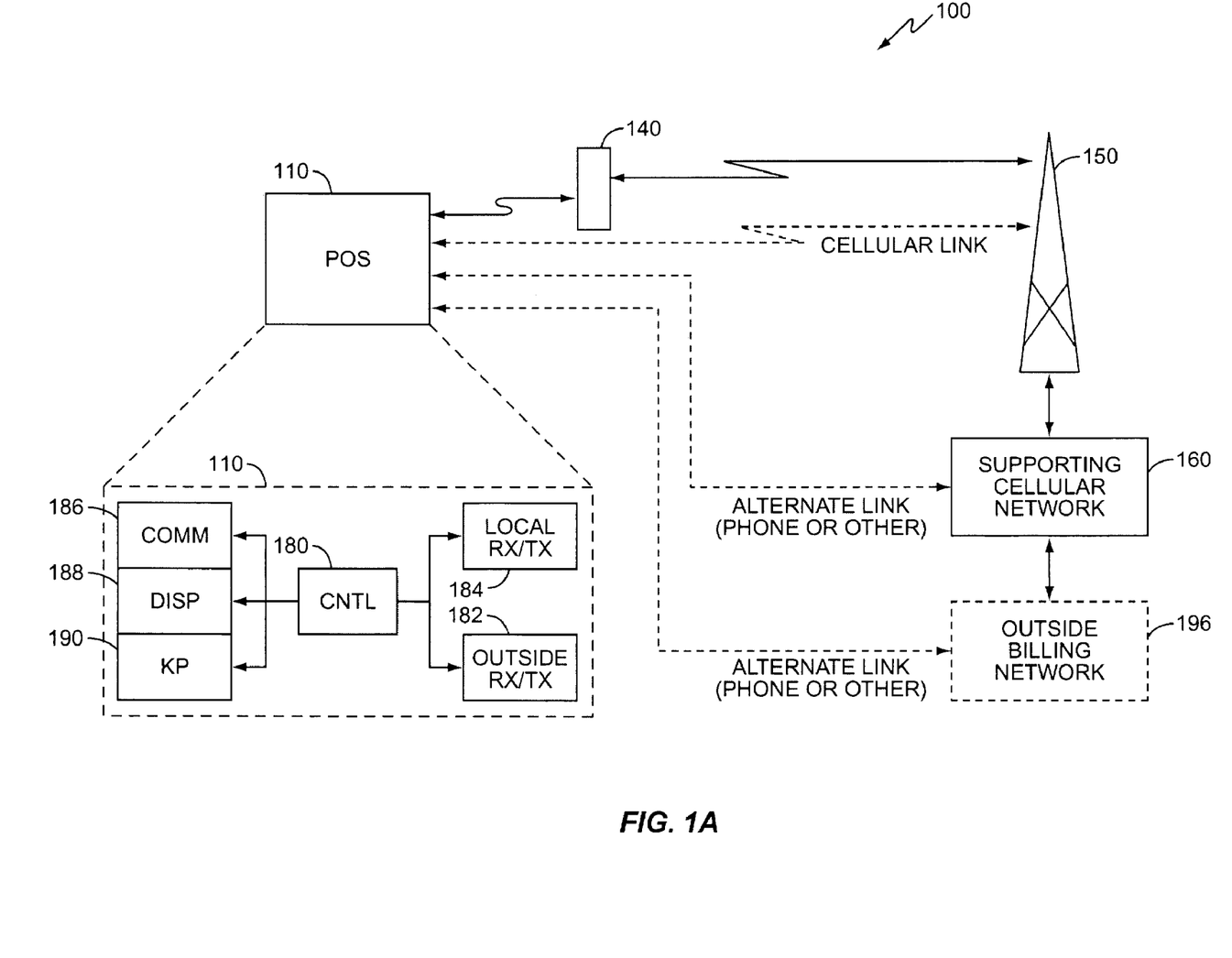
FIG. 1A depicts a simplified block diagram of one embodiment of the present invention in an in-store retail sales environment.

FIG. 1A depicts a simplified diagram of one embodiment of the present invention applied to a general retail sales environment. The system 100 permits a customer to conduct a retail transaction using their cellular telephone 140. A point-of-sale system (POS) 110 includes adaptations that allow it to communicate with the cellular telephone 140. Specifically, the POS 110 includes a local communications interface 184 adapted for localized communication with the cellular telephone 140. Such localized communication may be based on infrared, RF, or any other wireless communication means. The application of standardized IR communications ports to a variety of handheld devices, including cellular telephones, is becoming commonplace. U.S. Pat. No. 5,508,836 to Decaro, et al. and U.S. Pat. No. 5,907,418 to Walczak, et al. illustrate exemplary technical details regarding infrared-based communications and both of these U.S. patents are incorporated herein by reference. The incorporation of these named references is for illustration only. Indeed, many methods and standards exist for IR or RF wireless communication.

The POS 110 additionally includes a controller 180 for overall systems control, a display 188 for displaying information, a keypad 190 for accepting user input, a site communications interface 186 for communicating with other on-site systems, and an outside communications interface 182 for communicating with the supporting cellular network 160 or outside billing network 196. In either case, the outside communications interface 182 may be a cellular receiver/transmitter, modem, network interface, or other such communications interface.

To conduct a transaction, the customer positions their cellular telephone 140 proximate POS 110 such that POS 110 transfers select site information to the cellular telephone 140. The select site information may include a site identifier and an outbound phone number, or the outbound phone number may serve as the retail site identifier. Upon receiving this information, the cellular telephone 140 may automatically call the supporting cellular network 160 via base station 150. Alternatively, the cellular telephone may prompt the customer to initiate the call and may also require the customer to input a PIN. The supporting cellular network 160 receives the select site information from the cellular telephone 140, and additionally receives identifying customer information based on data stored in the cellular telephone 140. Preferably, the supporting cellular network 160 provides billing services and determines whether or not to authorize the transaction.

In this role, the supporting cellular network 160 is responsible for providing authorization information to the POS 110. Preferably, the supporting cellular network 160 returns this authorization information to the POS 110 via a cellular link. However, the supporting cellular network may contact the POS 110 directly or indirectly using standard telephone lines, network links, or any such combination. The supporting cellular network 160 may be any one of several different cellular network service providers and the specific network contacted will mostly likely be associated with the customers cellular telephone 140.

If the cellular network 160 associated with the customer's cellular telephone 140 is not adapted to provide billing services, it may relay information obtained from the customer cellular telephone 140 to an outside billing network 196. In this case, the outside billing network 196 provides authorization information to the POS 110. If an outside billing network is involved, authorization information is preferably returned to the POS 110 back through the supporting cellular network 160. However, a standard phone connection, or any other communications link, direct or indirect, between the POS 110 and the outside billing network 196, will suffice.

Figure 1B:
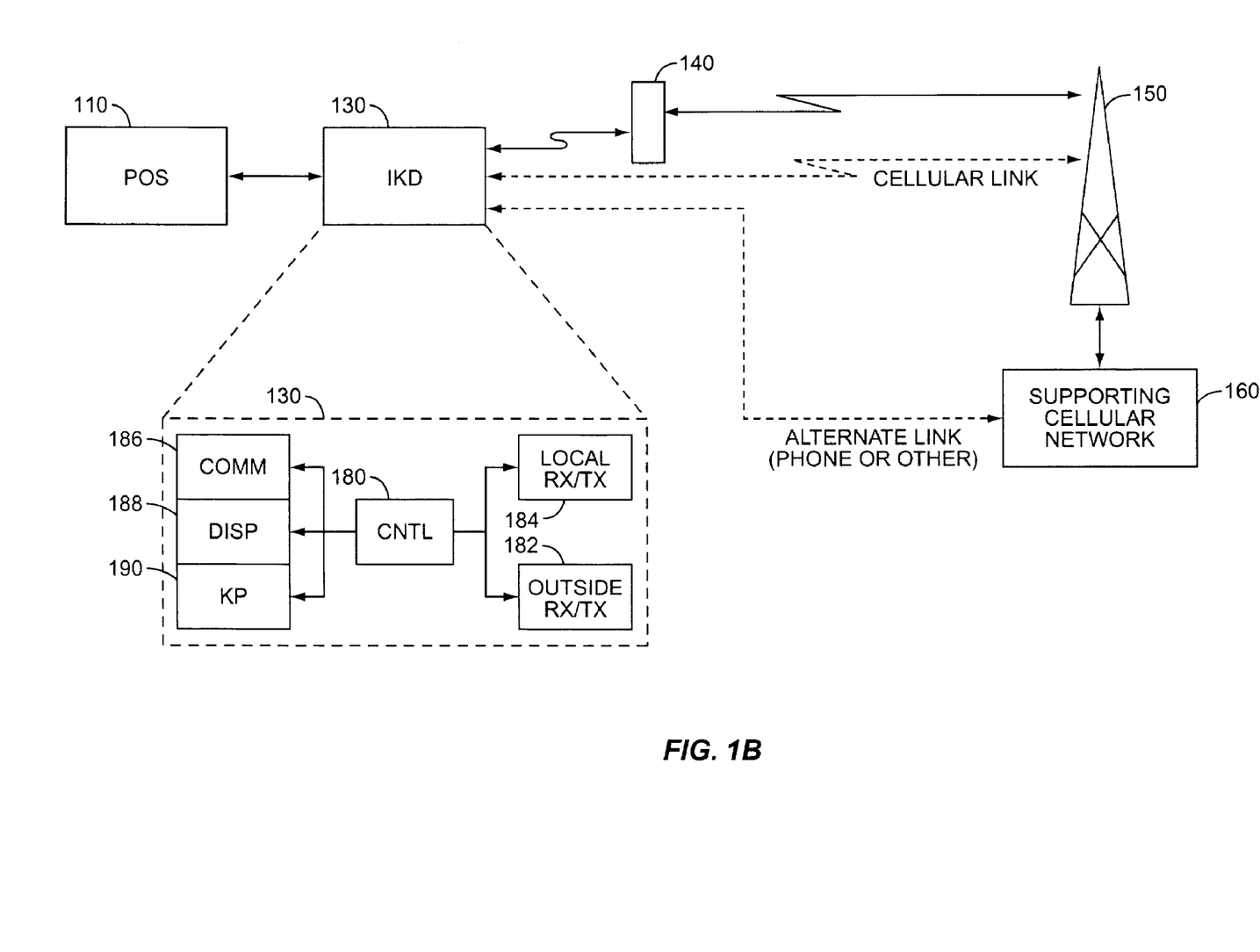
FIG. 1B depicts a simplified block diagram of a preferred embodiment of the present invention in an in-store retail sales environment.

FIG. 1B depicts the preferred embodiment of the present invention applied to a retail environment. An in-kiosk device (IKD) 130 supplements the POS 110. In this embodiment, the POS 110 is simplified because the systems required to interface with the customer cellular telephone 140 and the supporting cellular network 160 are included in the IKD 130. The communications link between the POS 110 and the IKD 130 may comprise any suitable physical connection and protocol. In the preferred embodiment, the communications link comprises an industry-standard EIA-232 link. Alternate embodiments may advantageously employ newer, higher-speed standards such as a universal-serial-bus (USB) connection.

In this preferred embodiment, the supporting cellular network 160 is adapted to provide billing services for retail transactions. A customer places their cellular telephone 140 proximate the IKD 130 where upon the IKD 130 transfers select site information to the cellular telephone 140 via its local communications interface 184. The IKD 130 may be adapted to recognize whether a given cellular telephone 140 is associated with an approved supporting cellular network 160. With this adaptation, the IKD 130 notifies a customer if their cellular telephone 140 is unable to conduct a retail transaction. The IKD 130 provides such notice on its display 188. Alternatively, the IKD 130 transmits a message containing such notice to the cellular telephone 140 for display to the customer. Further, the IKD 130 would prompt the customer to utilize alternate payment means.

Assuming the cellular telephone 140 is associated with an approved supporting cellular network 160, the cellular telephone 140 contacts the supporting cellular network 160 by dialing an outbound number included in the select site information transferred from the IKD 130. For additional security, the cellular telephone 140 may require a customer to input a PIN. The cellular telephone 140 transfers the select site information obtained from the IKD 130, as well as internally stored customer information, to the supporting cellular network 160. The supporting cellular network processes this information to determine transaction authorization and calls the IKD 130, as identified by the select site information received from the cellular telephone 140.

If the transaction is not authorized, the IKD 130 may provide such information to the customer on its display 188, or transfer an appropriate message to the cellular telephone 140 for display to the customer. In the event of a disallowed transaction, the IKD 130 preferably provides the customer with an alternate payment means. Such alternate payment means include credit card, debit card, cash, or other payment and/or credit device. Preferably, the IKD 130 also provides the customer with an opportunity to cancel the transaction.

If the transaction is authorized, the IKD 130 receives transaction total information from the POS 110 via its site communications interface 186. This transaction total information is relayed from the IKD 130 back to the supporting cellular network 160 via the outside communications interface 182. The supporting cellular network 160 processes the transaction charges against the customer account associated with the cellular telephone 140. The transaction charges would then appear on the customer's cellular telephone bill. Note that in other embodiments, the IKD 130 communicates with the supporting cellular network 160 through a conventional phone line or other communications link.

The local communications interface between the customer's cellular telephone 140 and the POS 110 or IKD 130 as shown in FIGS. 1A and 1B, respectively, may be based on a variety of communication schemes. One possibility is that the local communications interface 184 in either the POS 110 or IKD 130 continuously emits select site information and monitors for a return acknowledgment from a proximate cellular telephone. Alternately, the local communications interface 184 may be adapted to continuously monitor for an initiating signal emitted from the cellular telephone 140, and to transmit the select site information upon detection of such initiating signal. Of course, many possible communication schemes for the localized communication exist and all such variations are considered within the scope of the present invention.

Wireless communication between the POS 110 (as in FIG. 1A) or IKD 130 (as in FIG. 1B) and the supporting cellular network require definitive identification. A preferred means of establishing identification between the IKD 130 or POS 110 and the supporting cellular network 160 is to apply a triple-key Data Encryption Standard (DES) using a different-user-key-per-transaction (DUKPT) algorithm. Alternate means for securely establishing identification between the IKD 130 or POS 110 and the supporting cellular network 160 exist, and include methods based on RSA public key cryptography. All of these methods identified above are well known in the art.

The general retail sales embodiments of the present invention, as illustrated in FIG. 1A and 1B, are suitable for use in a variety of retail locations. Such retail locations my include gas stations, shoe stores, drugstores, department stores, or anywhere credit card is normally used. Thus, the IKD 130 or the point-of-sale system 110 may be further adapted to include a payment acceptor compatible with credit/debit cards, cash payment, or other payment means. Such adaptations are not critical to practicing the present invention but do provide additional transaction payment flexibility to the customer.

Figure 2A:
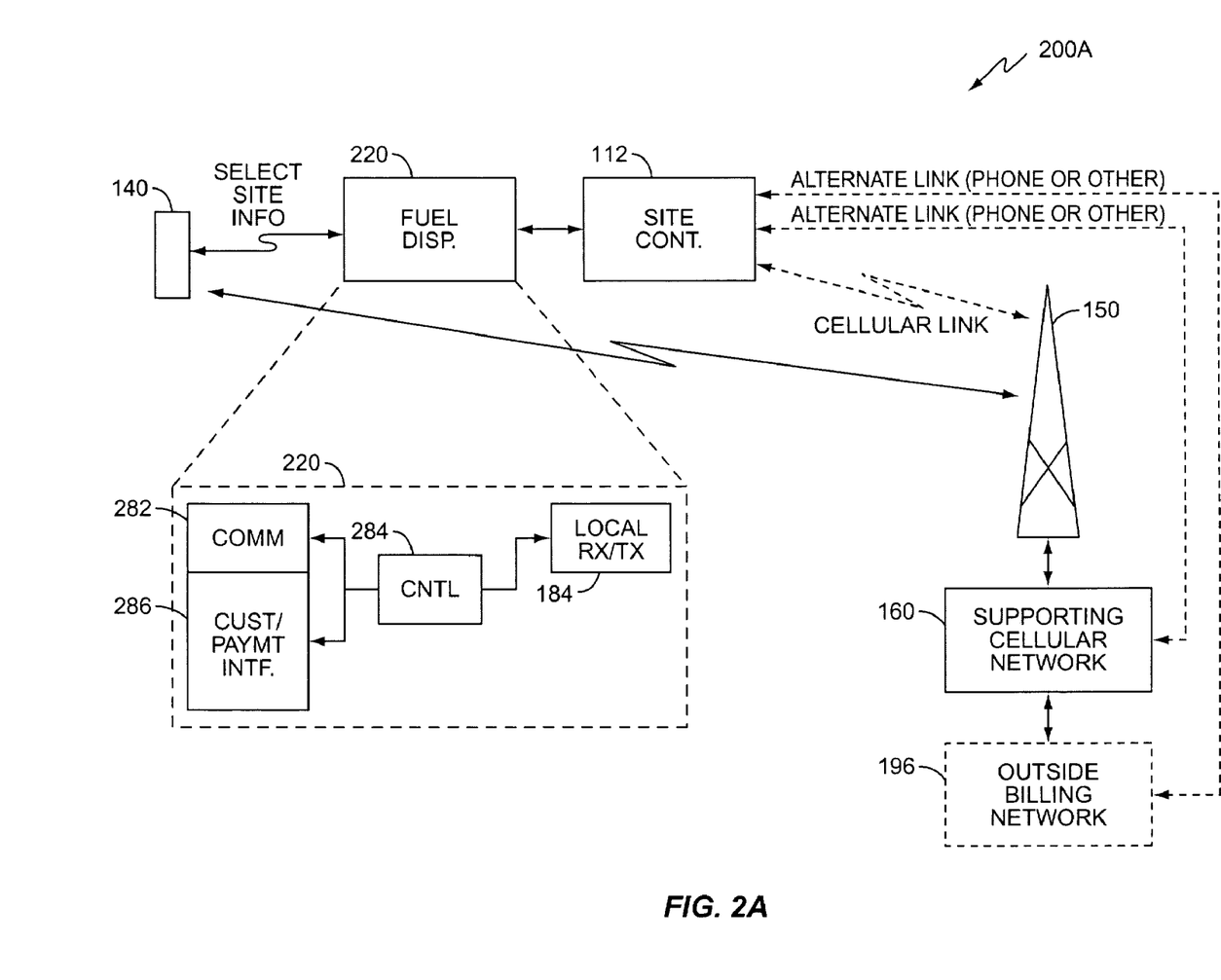
FIG. 2A depicts a simplified block diagram of one embodiment of the present invention in a fueling environment.

FIG. 2A depicts one embodiment of the present invention generally applied to a retail fuel sales environment. The system, generally referred to as 200A, includes a site controller 112 and at least one fuel dispenser 220. In this embodiment, the fuel dispenser 220 includes adaptations enabling it to communicate with a customer's cellular telephone 140 via a local communications interface 184.

As with the POS 110 of FIG. 1A and IKD 130 of FIG. 1B, the local communications interface 184 in the fuel dispenser 220 permits the fuel dispenser to communicate with a customer's cellular telephone via wireless communications. The fuel dispenser 220 further includes a site communications interface 282 for communicating with the site controller 112, a customer/payment interface 286 for communicating with and receiving payment from a customer, and a fuel dispenser controller 284 providing overall dispenser control. In a fuel-dispensing environment, a site controller 112 is adapted to provide control and monitoring for fuel dispensing activities.

As described earlier, the localized communication with the customer cellular telephone 140 may be based on IR, RF, or any other wireless communications means. The fuel dispenser 220 communicates select site information to the customer cellular telephone 140. If the site controller 112 is associated with a single fuel dispenser 220, the select site information conveyed from the fuel dispenser 220 to the customer's cellular telephone need only identify the site controller 112 or the fueling station with which the site controller 112 is associated. However, if the site controller is associated with a plurality of fuel dispensers 220, it is advantageous to include information in the select site information that identifies the particular fuel dispenser 220 at which a customer is engaged. By including such information, return authorization information obtained from a supporting cellular network 160 or outside billing network 196 can include this information, thereby allowing the site controller 112 to enable the appropriate fuel dispenser 112.

The cellular telephone 140 calls an outbound number included in the select site information, or calls an internally stored number associated with an identifying code included in the select site information. Additionally, the supporting cellular network 160 or outside billing network 196 may prompt the customer to enter their PIN. The cellular telephone 140 relays the select site information plus identifying customer information stored in the cellular telephone to the supporting cellular network 160 via base station 150.

The supporting cellular network 160 may determine transaction authorization or may relay this information to an outside billing network 196 for the purpose of obtaining authorization. In either case, transaction authorization information may be returned to the site controller 112 via a cellular link, network link, conventional telephone link, or any other communications link, such as an Internet connection. As noted, the select site information transferred from fuel dispenser 220 to the cellular telephone 140 can include information allowing the site controller 112 to identify which fuel dispenser to enable, particularly if the site controller 112 controls a plurality of fuel dispensers 220. Thus, the authorization information returned from the supporting cellular network 160 or outside billing network 196 includes this identifying information.

The fuel dispenser 220 returns information related to an amount or a cost of the fuel dispensed during an authorized fueling transaction and the site controller 112 determines a total cost for the transaction. Note that the fuel dispenser 220 may include an interface supporting the purchase of a multitude of goods and services and the transaction total may include the purchase of such non-fuel items or services. The site controller 112 transfers the total transaction cost information back to the supporting cellular network 160 or outside billing network 196 via its outside communications interface 182. The outside communications interface 182 provides a communications link on which authorization information may be received and transaction total costs may be transmitted. Of course, other information may be sent or received via the outside communications interface 182. The outside communications interface 182 may be a modem, network interface, cellular communications link, or other communications connection. Preferably, the outside communications interface 182 is a cellular communications interface to the supporting cellular network 160.

If the customer cellular telephone 140 is based on secure digital communication protocols, the intrinsic security afforded by such protocols may obviate the need for the fuel dispenser 220 to handle sensitive PIN information. For example, the fuel dispenser 220 may eliminate the PIN entry and encryption hardware from its customer/payment interface 286, relying instead on a digital cellular telephone 140 for transfer of PIN information to an authorization network. Elimination of the PIN handling hardware from a standard fuel dispenser 220 has increasing viability given the growing prevalence of cellular telephones. Of course, a fuel dispensing system based on the present invention may retain secure PIN entry capabilities at the fuel dispenser 220 as a convenience to those customers lacking secure digital cellular telephones.

Figure 2B:
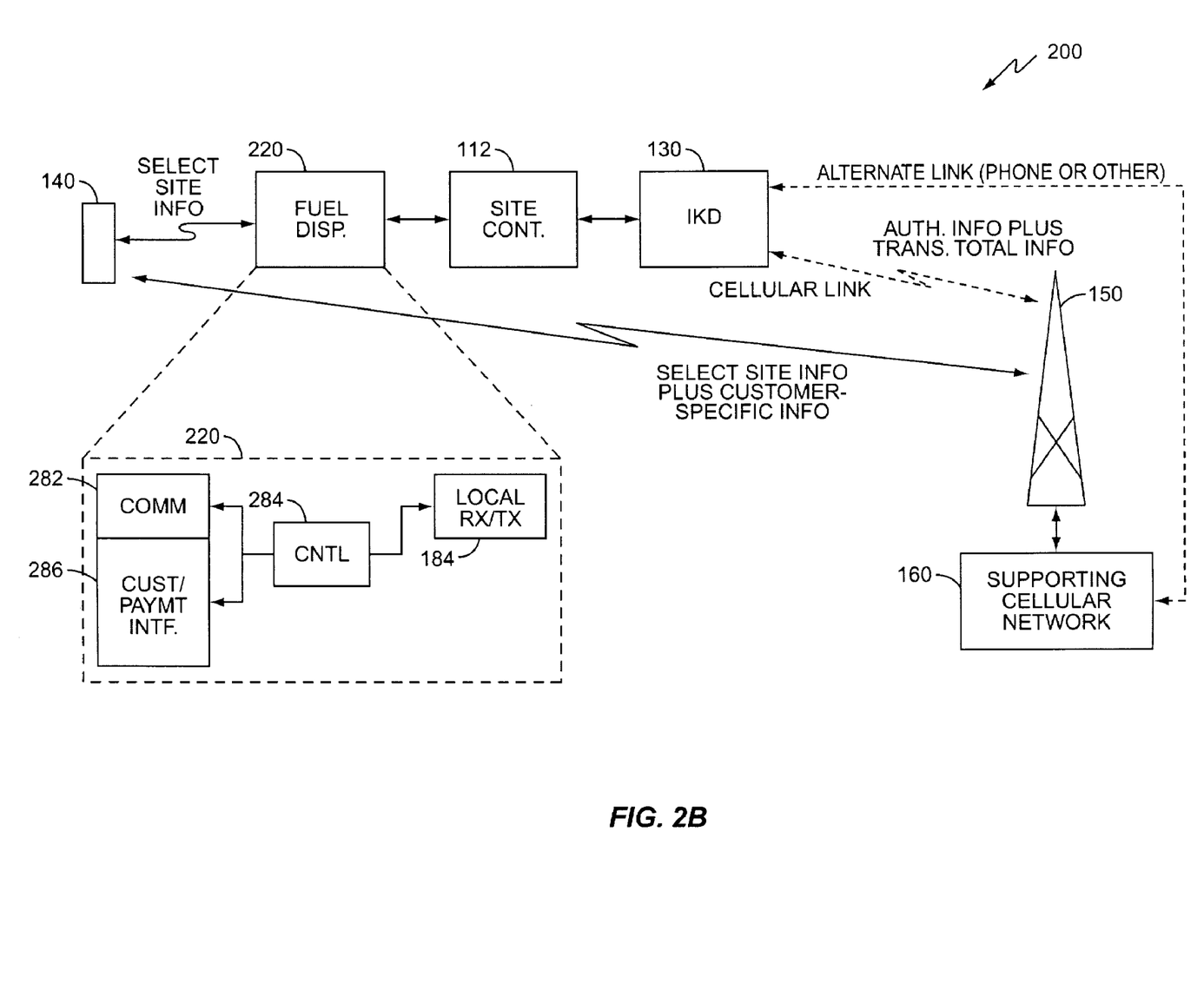
FIG. 2B depicts a simplified block diagram of a preferred embodiment of the present invention in a fueling environment.

FIG. 2B depicts the preferred embodiment of the present invention applied to a fueling environment, the system generally referred to by the numeral 200. In the preferred embodiment, the site controller 112 cooperates within the IKD 130, as described in the relationship between the POS 110 and IKD 130 in FIG. 1B. The fuel dispenser 220 transfers select site information to the cellular telephone 140 as described previously, the cellular telephone 140 transfers this information to the supporting cellular network 160. In the preferred embodiment, the supporting cellular network determines transaction authorization to communicate back to the IKD 130 via a cellular communications link included within the IKD 130.

The IKD 130 relays this authorization information to the site controller 112 and, in turn, the site controller 112 uses this authorization information to enable the fuel dispenser 220 if the authorization information indicates the transaction is approved. The fuel dispenser 220 sends a transaction total or a dispensed fuel amount total back to the site controller 112 for calculation of final transaction charges. The site controller 112 transfers this information to the IKD 130 where it is relayed via cellular communications link to the supporting cellular network 160 through base station 150. Preferably, the fuel dispenser 220 includes adaptations in its customer/payment interface 286 that support alternate payment means if the cellular-based transaction is not approved, or if the customer lacks a cellular phone capable of working in the present invention.

Note that as previously discussed, the fuel dispenser 220 may be adapted to communicate with cellular telephone 140 via its local communications interface 280 for the purpose of determining whether the cellular telephone 140 is associated with approved supporting cellular network 160. In one embodiment, the site controller 112 access stored information to make this determination. In other embodiments, the customer's cellular telephone 140 may provide information identifying whether it is capable of supporting a sales transaction. In any case, if the cellular telephone 140 is not suitable for conducting a fueling transaction, the fuel dispenser 220 may display or cause the cellular telephone 140 to display a message prompting the customer to provide alternate payment means.

Further note that the possible communication schemes for the localized communication between the POS 110 or IKD 130 and the cellular telephone 140 as discussed in the context of FIGS. 1A and 1B also apply to the localized communications between the fuel dispenser 220 and a cellular telephone 140. Indeed, the specific protocol or method of communications between the fuel dispenser 220 and the customer cellular telephone 140 is not critical to practicing the present invention.

The present invention also admits significant flexibility regarding the data included in the select site information transferred to the customer's cellular telephone 140 from the POS 110, site controller 112, IKD 130 or fuel dispenser 220. In a retail sales environment, as illustrated in FIGS. 1A and 1B, the select site information could simply be a telephone number, the number itself uniquely identifying the retail sales system 100 to the supporting cellular network 160. Of course, in a retail environment comprising multiple POS 110 terminals, the select site information might include further data identifying a particular POS 110. In yet another option, the customer's cellular telephone may be pre-programmed with a default transaction telephone number and the select site information identifies the particular POS 110.

Fueling environments illustrated in FIGS. 2A and 2B entail similar select site information requirements. In fueling environments where the site controller 112 is associated with multiple fuel dispensers 220, each capable of supporting cellular telephone-based fueling transactions, the select site information includes information sufficient to allow the authorization network to return information back to the site controller sufficient to allow it to enable the correct fuel dispenser 220. Provided the select site information transferred to the customer's cellular telephone 140 in combination with identifying customer information already stored in the cellular telephone 140 permits the authorization network 196 to identify the customer and the particular site controller 112 and/or fuel dispenser 220, the content and structure of the select site information is not critical to practicing the present invention.

Figure 2C:
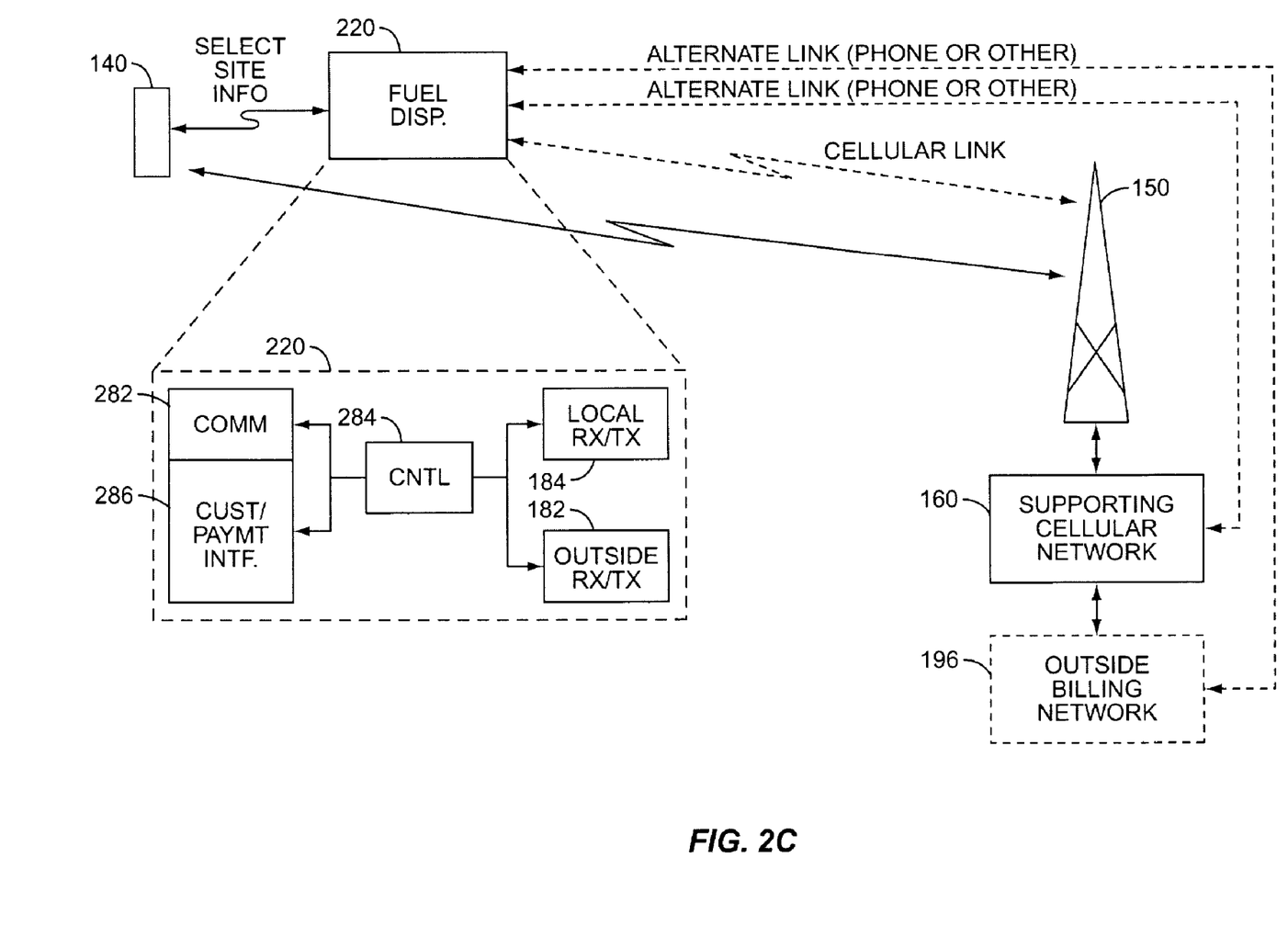
FIG. 2C depicts a simplified block diagram of an alternate embodiment of the present invention in a fueling environment.

FIG. 2C depicts an alternate embodiment of the present invention wherein the fuel dispenser 220 receives authorization information directly. In this embodiment, the fuel dispenser's dispenser controller 284 functions like the site controller 212 in other embodiments. That is, the fuel dispenser 220 in this embodiment is capable of operating in a stand-alone fashion. As with other embodiments, a supporting cellular network 160 may authorize the fueling transaction directly, or may rely on an outside billing network 196 for authorization. In either case, authorization information may be returned to the fuel dispenser 220 via its outside communications interface 182 using a cellular link, regular telephone, or any other communications link.

Figure 2D:
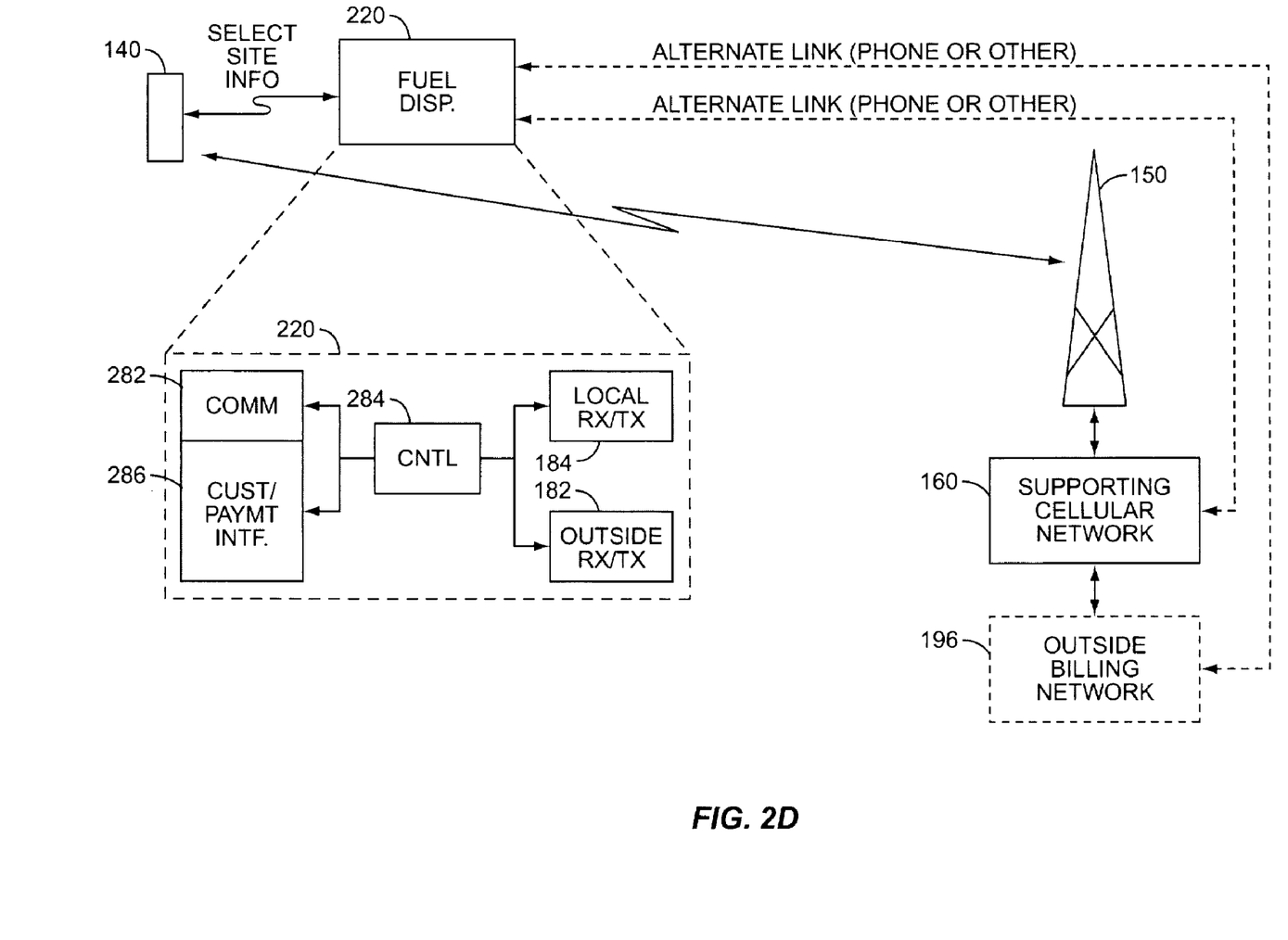
FIG. 2D depicts a simplified block diagram of still another embodiment of the present invention in a fueling environment.

FIG. 2D depicts another embodiment of the present invention. Here, a customer's cellular telephone 140 receives select site information from the local communications interface 184 of fuel dispenser 220 and places an outbound call for the purpose of obtaining authorization for a fueling transaction. Rather than the supporting cellular network 160 or outside billing network 196 returning the authorization information to the fuel dispenser 220 via its outside communications interface 182, the authorization information is returned directly to the customer's cellular telephone 140. From there, the information is conveyed to the fuel dispenser 220 via the local communications interface 184. Of course, transaction settlement information may still be transferred between the fuel dispenser 220 and supporting cellular network 160 or outside billing network 196 upon completion of the transaction via the outside communications interface 182.

FIG. 3A illustrates in simplified fashion the logical operation of the fuel dispenser 220 in accordance with the preferred embodiment of the present invention. Operation starts (block 310) with the fuel dispenser 220 continuously sending signals (block 312) suitable for reception by a proximate cellular telephone 140. Absent an acknowledgment from a proximate cellular telephone 140 (block 314), the fuel dispenser continues sending the IR information. Of course, in this state, the fuel dispenser 220 is still capable of responding to non-cellular based customer transactions, such as conventional credit or debit card purchases. When the fuel dispenser 220 does receive an acknowledgment (block 314), it sends the select site information to the proximate cellular telephone 140 (block 316). At this point, the cellular telephone 140 dials the outbound number included as part of the select site information and the fuel dispenser 220 waits to receive authorization from the site controller 112 (block 318). The waiting period may be predicated on a predetermined time-out value such that the fuel dispenser 220 does not wait indefinitely on authorization (block 318). If authorization is not received (block 320), the fuel dispenser offers the customer an alternate means of payment (block 322). If the customer provides an alternate means payment (block 324), the fuel dispenser 220 conducts the transaction (block 326). If the customer does not provide an alternate means of payment (block 324), the fuel dispenser ends the transaction (block 330). If the transaction is authorized (block 320), the fuel dispenser conducts the transaction (block 326) and sends transaction data back to the site controller 112 (block 328). From the fuel dispenser's perspective, the transaction ends at this point (block 330).

FIG. 3B illustrates the same cellular based transaction flow logic but from the perspective of the site controller 112. The process starts (block 360) with the point-of-sale system waiting on incoming call (block 362). As earlier noted, the incoming call is received through IKD 130. While the site controller 112 is waiting on incoming call, it is available for other transaction processing. In the absence of incoming calls (block 364), the site controller 112 continues waiting (block 362). When an incoming call is received (block 364), the site controller 112 receives the authorization information determined by the supporting cellular network 160 (block 366). If the authorization information indicates that the transaction is authorized (block 368), the point-of-sale system sends an authorization signal to the fuel dispenser 220 (block 374). As there are likely multiple fuel dispensers at a kiosk (or convenience store), the site controller 112 receives the dispenser ID from the supporting cellular network 160 as part of the transaction authorization information. In this manner, the site controller 112 sends the authorization signal to the appropriate fuel dispenser 220. Once authorized, the customer completes their transaction at the fuel dispenser 220 and, in turn, the fuel dispenser 220 communicates the transaction information back to the site controller 112 (block 376). Based on the transaction information received from the fuel dispenser 220, the site controller determines a transaction total and sends this transaction total back to the cellular network 160 through the IKD 130 (block 378).

Once the transaction total information has been communicated to the supporting cellular network 160, the transaction ends (block 380). If the authorization information indicates that the transaction is not authorized (block 368), the site controller 112 is adapted to cause the fuel dispenser 220 to offer the customer an alternate means payment (block 370). Such alternate means of payment may be advantageously based on the various payment means included in the customer/payment interface 286 of fuel dispenser 220. If the customer provides an alternate means of payment (block 372), the site controller 112 authorizes the dispenser to conduct the transaction (block 382). Once the customer completes their transaction at fuel dispenser 220, the site controller 112 receives transaction information from the fuel dispenser 220 (block 384) and totals the transaction charges based on this transaction information. The totaled transaction charges are then assessed against a customer account associated with the alternate payment means (block 386).

The foregoing descriptions and illustrations of the preferred embodiment and alternate embodiments of the present invention are not intended to be limiting. The exemplary information provided herein facilitates understanding of the present invention but does not limit it. The present invention permits, among other things, a point-of-sale terminal or associated interface device (such as an IKD), or a fuel dispenser to use a customer's cellular telephone as an outbound link to a transaction authorization network. The broad utility of the present invention will be readily apparent to those skilled in the art and the attached claims define the scope and limitations of the present invention.

What is claimed is:

1. A fuel dispensing system, comprising:
   a plurality of fuel dispensers, each of said plurality of fuel dispensers capable of conducting a fueling transaction with a customer having a cellular telephone, each of said plurality of fuel dispensers comprising:
   i) a customer interface for communicating with the customer; and
   ii) a site communications interface for communicating with a point-of-sale system; and
   iii) a local communications interface for transmitting site information from
   said point-of-sale system to said cellular telephone via a wireless signal;
   said cellular telephone adapted to transmit said site information and additional customer information to an authorization network; and
   said point-of-sale system adapted to selectively enable one of said plurality of fuel dispensers to conduct said fueling transaction and determine a transaction cost associated with said fueling transaction, and
   said point-of-sale system adapted to receive authorization information from said authorization network and to selectively enable one of said plurality of fuel dispensers based on said authorization information.

2. The fuel dispensing system of claim 1 wherein said point-of sale system is further adapted to transmit said transaction cost back to said authorization network.

3. The fuel dispensing system of claim 1 wherein said site information includes an outbound telephone number and said cellular telephone uses said outbound telephone number to contact said authorization network.

4. The fuel dispensing system of claim 3 wherein said outbound telephone number serves to identify said one of said plurality of fuel dispensers to said authorization network.

5. The fuel dispensing system of claim 1 wherein said site information includes site identification information and said authorizing network contacts said point-of-sale system based on said site identification information.

6. The fuel dispensing system of claim 1 wherein said site information includes fuel dispenser identification information, and said authorization network returns said fuel dispenser identification information to said point-of-sale system as part of said authorization information, thereby allowing said point-of-sale system to selectively enable a particular one of said plurality of fuel dispensers.

7. The fuel dispensing system of claim 1 wherein said authorizing network is a supporting cellular network associated with said cellular telephone.

8. The fuel dispensing system of claim 7 wherein said point-of-sale system receives said authorization information from said supporting cellular network via a cellular communications interface operatively associated with said point-of-sale system.

9. The fuel dispensing system of claim 7 wherein said point-of-sale system is further adapted to transmit said transaction cost back to said supporting cellular network via said cellular communications interface.

10. The fuel dispensing system of claim 1 wherein said cellular telephone uses a secure digital communication protocol, and said authorization network receives a PIN from said cellular telephone to verify the customer identity.

11. The fuel dispensing system of claim 1 wherein each of said plurality of fuel dispensers is further adapted to accept an alternate payment means for conducting said fueling transaction with a customer lacking a cellular telephone.

12. A fuel dispensing system comprising:
   a) a fuel dispenser for selectively conducting a fueling transaction with a customer and comprising:
      i) a customer interface for communicating with the customer; and
      ii) a site communications interface for communicating with a point-of-sale system;
   b) a first communications interface operatively associated with said fuel dispenser adapted to transmit site information to the customer's cellular telephone
   c) said cellular telephone adapted to transmit said site information and additional customer information to an authorization network; and
   d) a controller operatively associated with said fuel dispenser for selectively enabling said fuel dispenser to conduct said fueling transaction with the customer.

13. The fuel dispensing system of claim 12 wherein said controller operatively associated with said fuel dispenser is a separate site controller.

14. The fuel dispensing system of claim 13 further comprising a second communications interface operatively associated with said site controller, wherein said site controller is adapted to selectively enable said fuel dispenser to conduct said fueling transaction with the customer based on authorization information received via said second communications interface from the authorization network.

15. The fuel dispensing system of claim 12 wherein said controller is a dispenser controller and is integral to said fuel dispenser.

16. The fuel dispensing system of claim 15 further comprising a second communications interface operatively associated with said dispenser controller, wherein said dispenser controller is adapted to selectively enable said fuel dispenser to conduct the fueling transaction with the customer based on authorization information received via said second communications interface from the authorization network.

17. The fuel dispensing system of claim 12 wherein said controller is adapted to selectively enable said fuel dispenser to conduct the fueling transaction with the customer based on authorization information returned form the authorizing network to said cellular telephone and then from said cellular telephone to the fuel dispenser through said first communications interface.

18. A fuel dispensing system comprising:
a fuel dispenser for conducting a fueling transaction with a customer having a cellular telephone and comprising:
  i) a customer interface for communicating with the customer; and
  ii) a site communications interface for communicating with a point-of-sale system;
  iii) a local communications interface for transmitting site information to said cellular telephone via a wireless signal;
said cellular telephone adapted to transmit said site information and additional customer information to an authorization network; and
said point-of-sale system is adapted to selectively enable said fuel dispenser to conduct said fueling transaction and for determining a transaction cost associated with said fueling transaction;
said point-of-sale system is adapted to receive authorization information from the authorization network and to selectively enable said fuel dispenser based on said authorization information; and
said site information includes an outbound telephone number and said cellular telephone uses said outbound telephone number to contact said authorization network.

19. The fuel dispensing system of claim 18 wherein said outbound telephone number serves to identify said fuel dispensing system to said authorization network.

20. A method of using a customer's cellular telephone to selectively conduct a fueling transaction at one of a plurality of fuel dispensers, comprising the steps of:
transmitting site information from a local communications interface associated with one of said plurality of fuel dispensers to the customer's cellular telephone;
transmitting site information plus additional customer information from the cellular telephone to an authorization network;
determining authorization information at said authorization network based on the additional customer information;
receiving the authorization information from said authorization network at a point-of-sale system operatively associated with said one of said plurality of fuel dispenses; and
transmitting the authorization information from said point-of-sale system to a site communications interface associated with said one of said plurality of fuel dispensers;
communicating with the customer using a customer interface associated with one of said plurality of fuel dispensers; permitting the customer to conduct a fueling transaction; and
determining a transaction cost associated with said fueling transaction.

21. The method of claim 20, further comprising transmitting said transaction cost back to said authorization network.

22. The method of claim 20, further comprising using an outbound telephone number from said site information to contact said authorization network.

23. The method of claim 22, further comprising using said outbound telephone number identify said one of said plurality of fuel dispensers to said authorization network.

24. The method of claim 20, further comprising the step of contacting said point-of-sale system based on a site identification in said site information.

25. The method of claim 20, further comprising returning a fuel dispenser identification information from said site information to said point-of-sale system as part of said authorization information, thereby allowing said point-of-sale system to selectively enable a particular one of said plurality of fuel dispensers.

26. The method of claim 20, further comprising receiving said authorization information from said authorizing network at said point-of-sale system via a cellular communications interface operatively associated with said point-of-sale system.

27. The method of claim 26 wherein said point-of-sale system is further comprising transmitting said transaction cost back to said authorization network via said cellular communications interface.

28. The method of claim 20, further comprising using a secure digital communication protocol at said cellular telephone, and receiving a PIN from said cellular telephone at said authorization network to verify the customer identity.

29. The method of claim 20 wherein each of said plurality of fuel dispensers is further adapted to further comprising accepting an alternate payment means at each of said plurality of fuel dispensers for conducting said fueling transaction with a customer lacking a cellular telephone.

30. A method of using a customer's cellular telephone to selectively conduct a fueling transaction at one of a plurality of fuel dispensers, comprising:
transferring site information associated with one of said plurality of fuel dispensers to the customer's cellular telephone;
transmitting site information plus additional customer information from the cellular telephone to an authorization network;
determining authorization information at said authorization network based on the additional customer information; and
receiving the authorization information from the authorization network at a point-of-sale system operatively associated with said plurality of fuel dispensers;
said point-of-sale system adapted to enable selectively said one of said plurality of fuel dispensers based on the authorization information, thereby permitting the customer to conduct a fueling transaction.

31. The method of claim 30, further comprising determining a transaction cost associated with said fueling transaction.

32. The method of claim 31, further comprising transmitting said transaction cost back to said authorization network.

33. The method of claim 30, further comprising using an outbound telephone number from said site information to contact said authorization network.

34. The method of claim 30, further comprising contacting said point-of-sale system based on a site identification in said site information.

35. The method of claim 30, further comprising receiving said authorization information from said authorization network at said point-of-sale system via a cellular communications interface operatively associated with said point-of-sale system.

36. A method of using a customer's cellular telephone to selectively conduct a fueling transaction at one of a plurality of fuel dispensers, comprising:
transferring site information associated with one of said plurality of fuel dispensers to the customer's cellular telephone;
transmitting site information plus additional customer information from the cellular telephone to an authorization network;
determining authorization information from the authorization network; and enabling said one of said plurality of fuel dispensers selectively based on the received authorization information, thereby permitting the customer to conduct the fueling transaction.

37. The method of claim 36, further comprising determining a transaction cost associated with said fueling transaction.

38. The method of claim 37, further comprising transmitting said transaction cost back to said authorization network.

39. The method of claim 36, further comprising using an outbound telephone number from said site information to contact said authorization network.

* * * * *

UNITED STATES PATENT AND TRADEMARK OFFICE
CERTIFICATE OF CORRECTION

PATENT NO. : 7,039,389 B2
APPLICATION NO. : 10/349352
DATED : May 2, 2006
INVENTOR(S) : William S. Johnson, Jr.

It is certified that error appears in the above-identified patent and that said Letters Patent is hereby corrected as shown below:

Column 11
Lines 34-37, change
"iii)  a local communications interface for transmitting
       site information from
said point-of-sale system to said cellular telephone via a
       wireless signal;"

to
--iii)  a local communications interface for transmitting
       site information from said point-of-sale system to said
       cellular telephone via a wireless signal;--

Signed and Sealed this

Eighth Day of August, 2006

JON W. DUDAS
*Director of the United States Patent and Trademark Office*